Dec. 3, 1957  J. K. GOSS  2,814,951
FUEL QUANTITY MEASURING APPARATUS
Filed Aug. 10, 1953
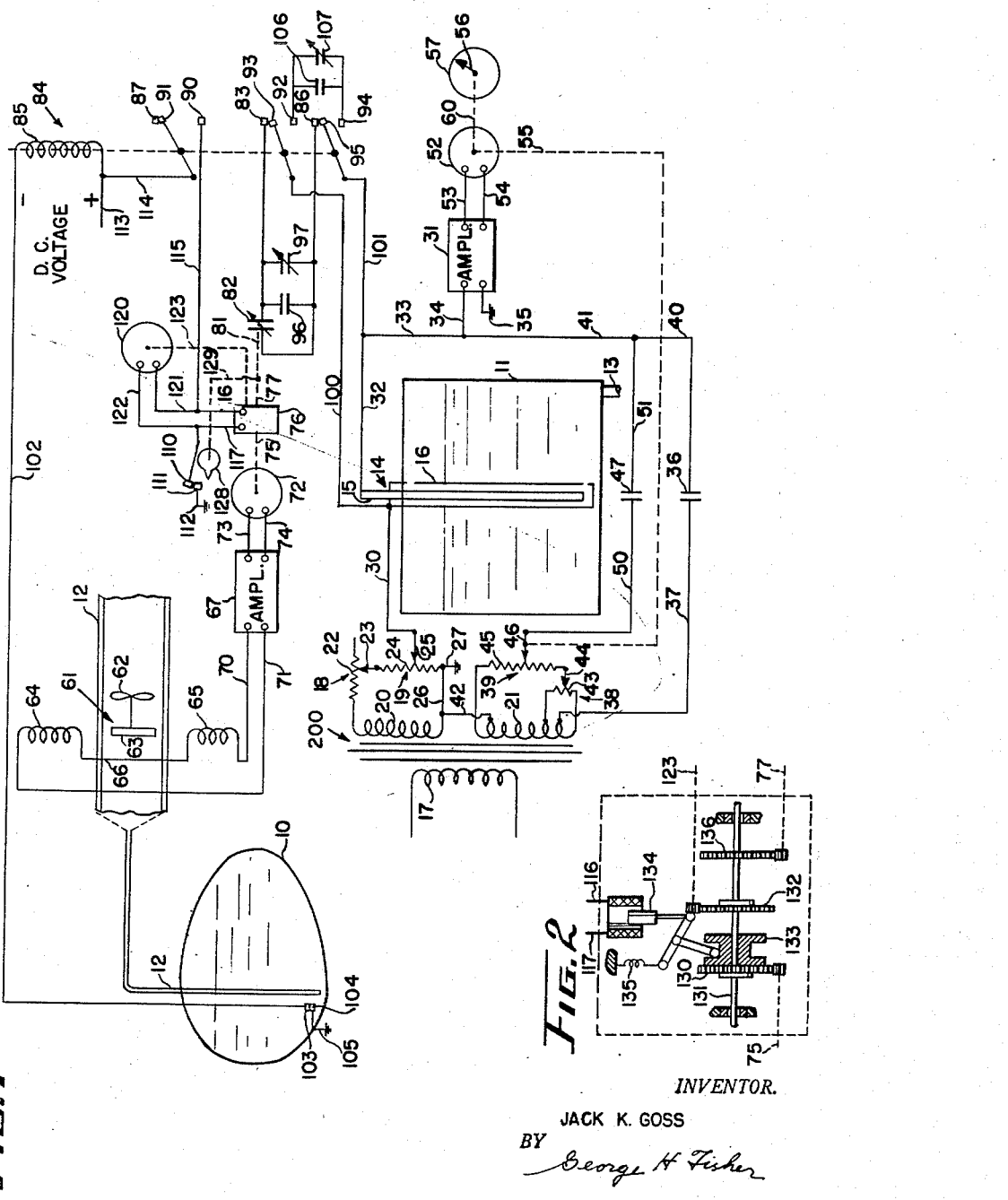
INVENTOR.
JACK K. GOSS
BY
George H Fisher
ATTORNEY

United States Patent Office 2,814,951
Patented Dec. 3, 1957

2,814,951

FUEL QUANTITY MEASURING APPARATUS

Jack K. Goss, Kensington, Md., assignor to Minneapolis-Honeywell Regulator Company, Minneapolis, Minn., a corporation of Delaware Application August 10, 1953, Serial No. 373,171

13 Claims. (Cl. 73—304)

This invention relates to apparatus for measuring the quantity of a substance in a container and particularly to apparatus for indicating the quantity of fuel in an aircraft droppable fuel tank. It is therefore an object of this invention too design new and improved apparatus responsive to the quantity of fuel in a droppable fuel tank.

Heretofore, in order to measure the quantity of fuel in an aircraft droppable tank, it has been necessary to place various expensive components of the fuel quantity measuring apparatus in the droppable tank. This meant that when the fuel in these tanks was used and the tanks dropped from the aircraft that these components were also lost. It is therefore another object of this invention to design improved apparatus for measuring the quantity of fuel in a droppable tank by means external to the tank.

Another object of the invention is to design apparatus using the flow of fuel through the outlet pipe for measuring the quantity of fuel in a droppable tank in a manner easily correlated with the measuring means of other tanks.

Briefly, the invention comprises placing a flowmeter in the outlet pipe of the droppable fuel tank, with the flowmeter generating a signal of varying frequency which is used to vary the impedance of an impedance device, such as a variable capacitor. A voltage impressed across the capacitor enables a signal to be derived from the capacitor indicative of quantity. The frequency of the signal generated by the flowmeter is indicative of the rate of fuel flow from the tank. The impedance of the impedance device, therefore, changes according to the quantity of fuel leaving the tank. As a result, with proper calibration, the impedance of the impedance device is indicative of the quantity of fuel remaining in the tank. If the impedance device is a variable capacitor the signal from the capacitor may be added to the signals from capacitive type tank units inserted in the aircraft tanks which form a permanent part of the aircraft to derive an indication of the total quantity of fuel in the aircraft.

For a further explanation of the invention reference is had to the following detailed description taken in conjunction with the accompanying drawing in which:

Figure 1 is a schematic diagram of an embodiment of the invention; and

Figure 2 shows a clutching arrangement which may be used in the circuit.

The tanks containing the fuel, the quantity of which is being measured, are designated 10 and 11. Tank 10 is a droppable tank while tank 11 forms a permanent part of the aircraft. Tank 10 has an outlet pipe 12, a portion of which is shown in enlarged cross-section for convenience. The pipe 12 feeds fuel from the tank 10 to the engine or engines of the aircraft, not shown. Tank 11 has an outlet pipe 13 for feeding the fuel from tank 11 to the engine or engines.

Tank 11 is shown as being symmetrical in shape although it is realized that, because of space limitations, most of the permanent tanks in an aircraft are not symmetrical.

For simplicity, a single capacitive tank unit 14 is inserted in the tank 11 and extends from the top to the bottom of the tank. Tank unit 14 has an inner electrode 15 and an outer electrode 16. The two electrodes, 15 and 16, form the two plates of a capacitor which contains varying proportions of fuel and air between the plates as the fuel rises and falls in tank 11. Electrode 16 is shown to have apertures at the top and bottom of the electrode to permit free flow between electrodes 15 and 16 so the fuel level between electrodes is the same as in the tank. Because the dielectric constant of air is unity while the dielectric constant of fuel is approximately two, the capacitance of tank unit 14 varies with rise and fall of the fuel in the tank with a maximum approximately twice the value of the minimum.

Energization for the fuel quantity measuring apparatus is obtained from a transformer 200 having a primary winding 17 connected to a source of voltage, not shown. Transformer 200 also has transformer secondary windings 20 and 21. A rheostat 18 having a resistor 22 and a wiper arm 23 has one terminal of its resistor connected to the upper terminal of transformer secondary winding 20. A potentiometer 19 having a resistor 24 and a wiper arm 25 has one terminal of resistor 24 connected to the wiper arm 23 of rheostat 18 while the other terminal of the potentiometer resistor is connected by conductor 26 to the lower terminal of transformer secondary winding 20 and is also connected to a ground terminal 27.

The outer electrode 16 of measuring tank unit 14 is connected by conductor 30 to the wiper arm 25 of potentiometer 19. The inner electrode 15 is connected to an input terminal of an amplifier 31 by conductors 32, 33 and 34, the other input terminal of amplifier 31 being connected to a ground terminal 35.

A capacitor 36 has one of its plates connected by conductor 37 to a tap near the lower end of transformer secondary winding 21. The other plate of capacitor 36 is connected to the ungrounded input terminal of amplifier 31 by means of conductors 40, 41 and 34. Transformer secondary winding 21 is connected by a tap near its upper end to ground terminal 27 by conductors 42 and 26. As a result of the aforementioned connections of measuring tank unit 14 and capacitor 36 to the transformer 200, the voltages on the measuring tank unit 14 and capacitor 36 are opposite in phase, resulting in signals of opposite phase on the input circuit of amplifier 31.

A potentiometer 38 having a resistor 43 and a wiper arm 44 has its resistor 43 connected between the lower end and an intermediate tap of transformer secondary winding 21. A potentiometer 39 having a resistor 45 and a wiper arm 46 has one of its resistor terminals connected to the upper end of transformer secondary winding 21, while the other resistor terminal of potentiometer 39 is connected to the wiper arm 44 of potentiometer 38.

A capacitor 47 has one of its plates connected by a conductor 50 to the wiper arm 46 of potentiometer 39 and the other plate of capacitor 47 is connected by conductors 51, 41 and 34 to the ungrounded input terminal of amplifier 31.

Amplifier 31 is connected in controlling relation to a motor 52 by conductors 53 and 54. Motor 52 is connected by a mechanical connection 55 to the wiper arm 46 of potentiometer 39 for rebalancing purposes and is also mechanically connected to an indicator pointer 56 of an indicator 57 by a mechanical connection 60.

As the signal from capacitor 36 effectively neutralizes the signal from measuring tank unit 14 when there is no fuel in the tank, or the empty tank signal, it is then apparent that when the apparatus is balanced the signal due to capacitor 47 balances out the remaining portion of the signal from measuring tank unit 14 which is due to the fuel in the tank.

Because it is desirable not to place any expensive components in the droppable tank 10 that would be lost when the tank is dropped from the aircraft it is necessary to measure the quantity of fuel in tank 10 by means other than the means described for measuring the quantity of the fuel in tank 11. This can be done by using a flowmeter in the output line of tank 10 to determine the quantity of fuel withdrawn from tank 10 and, by properly using the signal output of the flowmeter, the quantity of fuel remaining can be determined.

In the enlarged cross-sectional view of the pipe 12 is shown a flowmeter rotor 61 having blades 62, rotatable by the flow of fuel through the pipe, and a permanent magnet 63, the magnet being rotatable by the blades 62 of the flowmeter rotor.

A pair of coils 64 and 65 are placed about the pipe 12 on the outside of the pipe with the turns of the coils being cut by the lines of force from the magnetic field due to magnet 63 as it rotates within the pipe. This induces voltages across coils 64 and 65. The inner ends of coils 64 and 65 are connected together by a conductor 66 and the outer terminals of the coils 64 and 65 are connected across the input circuit of an amplifier 67 by conductors 70 and 71. Thus, whenever there is a flow of fuel through the pipe 12, the flowmeter rotor 61 rotates and induces voltages in coils 64 and 65 of a frequency proportional to the speed of rotation and thus produces an input signal to amplifier 67.

Amplifier 67 is connected in controlling relation to a motor 72 by conductors 73 and 74.

Motor 72 is connected by shaft 75, clutch 76, and shafts 77 and 81 to a variable capacitor 82 so that operation of motor 72 results in varying the capacitance of variable capacitor 82.

One plate of variable capacitor 82 is connected to a fixed contact 83 of a relay 84 having an energizing winding 85. The other plate of variable capacitor 82 is connected to a fixed contact 86 of the relay 84.

Relay 84 has, in addition to the fixed contacts 83 and 86, fixed contacts 87 and 90, between which a movable contact 91 operates; a fixed contact 92 engageable by a movable contact 93 operating between fixed contacts 83 and 92, and a fixed contact 94 engageable by a movable contact 95 operating between fixed contacts 86 and 94. Relay coil 85 of relay 84 is shown to be energized by a source of direct current voltage although, obviously, any suitable current source may be used.

A fixed capacitor 96 and a variable capacitor 97 are connected in parallel with variable capacitor 82 across fixed contacts 83 and 86 of the relay 84.

Capacitor 82 is varied between two extreme limits by motor 72, and capacitors 96 and 97 cooperate with capacitor 82 to provide a signal, when capacitor 82 is at its minimum capacitance value, equal to the capacitance of a measuring tank unit, if one were inserted in tank 10, when tank 10 is empty. When the capacitance of variable capacitor 82 is adjusted to its other extreme so that this capacitance is at a maximum value, the total capacitance of the three capacitors 82, 96 and 97 is equal to the signal that would be derived from a measuring tank unit if one were to be inserted in the tank 10 when the tank is full.

A voltage is placed across the capacitors 82, 96 and 97 from transformer 200 by the following circuit: From wiper arm 25 of potentiometer 19, the resistor of which is connected across transformer secondary winding 20, through conductors 30 and 100, movable contact 93 of relay 84, fixed contact 83, to the three capacitors, and then through fixed contact 86, movable contact 95, and conductors 101, 33 and 34 to the ungrounded input terminal of amplifier 31 and then through ground terminals 35 and 27 back to transformer secondary winding 20. Because of the phasing of the energizing circuit for the capacitors 82, 96 and 97, it is seen that these three capacitors are placed in parallel across tank unit 14. As a result, the signal from the four capacitors are all added together and impressed on the input circuit of amplifier 31.

Because the signal from the capacitors 82, 96 and 97, indicating the quantity of fuel in the tank 10, are in parallel with measuring tank unit 14 in tank 11 it is, of course, desirable that the signal from capacitor 36 be equal in magnitude and opposite in phase to the empty tank signals from both measuring tank unit 14 and capacitors 82, 96 and 97. This is achieved by adjustment of resistors 18 and 19.

Relay coil 85, as stated previously, is connected across a source of direct current voltage. The lower terminal of the relay coil 85 is directly connected to the source of voltage, not shown, while the other terminal of the relay coil is connected through a conductor 102, fixed contact 103, float operated contact 104 and a ground terminal 105 to the direct current voltage source. The float for operating contact 104 is placed in the bottom of tank 10 and floats when there is fuel in the tank so that it makes contact with fixed contact 103 and thus completes the circuit to energize relay coil 85. When tank 10 is emptied of fuel, the float contact 104 drops to break the energizing circuit for the relay coil 85, causing the movable contacts 91, 93 and 95 to drop down to their out positions and engage fixed contacts 90, 92 and 94, respectively. When movable contacts 93 and 95 break contact with fixed contacts 83 and 96, the capacitors 82, 96 and 97 are disconnected from the circuit across tank unit 14 and in their place, fixed capacitor 106 and variable capacitor 107 are connected across measuring tank unit 14. Capacitors 106 and 107 provide a signal equivalent to the empty tank capacitance value of a tank unit were one to be placed in tank 10. Capacitor 107 is variable in value to facilitate the adjustment of the above mentioned equivalent signal. Capacitor 97 is likewise made adjustable for calibration purposes. By switching to capacitors 106 and 107 it is possible to eliminate any errors which might be due to the flowmeter and variation of capacitor 82 as the tank 10 is being emptied.

Variable capacitor 82 is normally adjusted by motor 72 as fuel is withdrawn from tank 10 hence it is important that its initial adjustment be correct or else all subsequent indications will be in error. Therefore, means are provided, as discussed below, for adjusting the value of capacitor 82 to the value that it should have when the droppable tank 10 is full of fuel.

When tank 10 is full cam 128 is so positioned as to break the connection of a movable switch contact 110 with its fixed contact 111, which is connected to a ground terminal 112. When tank 10 starts to empty cam 128 which is connected to the mechanical output of clutch 76 by mechanical connection 129 is rotated permitting switch contacts 110 and 111 to close. However, relay coil 85 is energized, breaking the connection between relay contacts 90 and 91.

When tank 10 is empty the connection between contact 103 and float contact 104 is broken, breaking the energizing circuit for relay coil 85. The relay contacts move to their deenergized positions and clutch 76 is energized from the direct current voltage source through conductors 113 and 114, movable relay contact 91, fixed relay contact 90, conductors 115 and 116 to the clutch 76, conductor 117 and switch contacts 110 and 111 to ground terminal 112. At the same time a motor 120 is also energized from the direct current voltage source through conductors 113 and 114, movable relay contact 91, fixed relay contact 90, conductors 115 and 121, motor 120, conductor 122, switch contacts 110 and 111 to ground terminal 112. As a result, the clutch 76 and motor 120 are energized only when the relay 84 is in its deenergized position and switch contacts 110 and 111 are closed, relay 84 being deenergized only when the tank has been emptied or has been dropped. Energization of motor 120, which is connected to variable capacitor 82 by mechanical connection 123, clutch 76 and mechanical connection 81, results in driving capacitor 82 back to its full position. When it is driven back to its full position, switch contacts 110 and 111 are opened by cam 128, which is operated by motor 120 by mechanical connections 123 and 129, to break the energizing circuits for clutch 76 and motor 120. Capacitor 82 is then again ready to properly indicate the quantity of fuel in the droppable tank when the next full tank is put on the aircraft to replace tank 10. When the next full tank is put on the aircraft it will have switch contacts similar to contacts 103 and 104 which will be closed, energizing relay winding 85 and moving contacts 91, 93 and 95 to their energized positions and the circuit is again ready to operate. If the tank is not dropped but is kept and refilled it must, of course, be filled completely.

By driving capacitor 82 back to its "full" value by motor 120 rather than by filling the tank through the line 12 and having the flowmeter operate on motor 72 to drive capacitor 82 it is possible to eliminate any errors in the apparatus due to any inaccuracies of the flowmeter or capacitor 82 which would otherwise accumulate.

It is observed that the clutch 76 has two mechanical input connections which alternatively operate the single mechanical output connection. An example of one type of clutch and gearing arrangement which might be used is shown in Figure 2. The mechanical connection 75 from motor 72 operates on a gear 130 which rotates freely on a shaft 131. Mechanical connection 123 from motor 120 operates on a gear 132 which also rotates freely on the shaft 131. A friction faced clutch 133 is splined to the shaft and is moved between the gears 130 and 132 so as to be rotated by either one or the other of the gears and so cause rotation of the shaft. The clutch 133 is moved by means of a solenoid 134 and a tension spring 135 which operate on the clutch 133 in opposition to each other through a system of levers. When the solenoid is not energized the spring 135 pulls the clutch 133 against gear 130 so that the shaft is rotated in accordance with the operation of motor 72 while when the solenoid is energized, due to the tank 10 being empty or having been dropped, the solenoid overcomes the effect of the spring and pulls the clutch 133 against gear 132 so that the shaft is rotated in accordance with the operation of motor 120. The mechanical output connection 77 is operated by a gear 136 which is fixed to the shaft and so rotates in accordance with whichever mechanical input connection is operative on the shaft.

It has been pointed out how it is possible to indicate the quantity of fuel in the droppable tank by means external to the tank, which include the use of a flowmeter in the output line and a variable capacitor operated through the operation of the flowmeter, with the signal from the variable capacitor being added to other capacitive signals in standard capacitance type of fuel quantity measuring circuits in order to indicate the total quantity of fuel on board an aircraft.

While a single embodiment has been shown and described it is realized that modifications might be made by those skilled in the art and it is therefore intended that this invention be limited only to the extent of the appended claims.

I claim as my invention:

1. Apparatus for measuring the quantity of fluid in several containers comprising in combination: first impedance means inserted in a first container and extending from the top of the container to the bottom and affected by the fluid such that the impedance of said first impedance means varies with the height of the fluid in the container; means electrically connecting said first impedance means to a source of voltage in a manner to derive a signal from said first impedance means indicative of the quantity of fluid in the first container; flow measuring means in an output pipe of a second container operative upon flow of fluid through the pipe; second impedance means connected to be controlled by said flow measuring means and adjusted in response to said flow measuring means to vary the impedance of said second impedance means upon operation of said flow measuring means such that the impedance of said second impedance means is a function of the quantity of fluid still in the second container; means electrically connecting said second impedance means to a source of voltage in a manner to derive a signal from said second impedance means indicative of the quantity of fluid in the second container; and signal responsive indicating means electrically connected to said first and second impedance means and controlled by the signals therefrom for indicating the total quantity of fluid in the containers.

2. Apparatus for measuring the quantity of fluid in several containers comprising in combination: a first capacitor inserted in a first container and extending from the top of the container to the bottom and affected by the fluid such that the capacitance of said first capacitor varies with the height of the fluid in the container; first means connecting said first capacitor to a source of voltage in a manner to derive a signal from said first means indicative of the quantity of fluid in the first container; flow measuring means in an output pipe of a second container operative upon flow of fluid through the pipe; a second capacitor connected to be controlled by said flow measuring means and adjusted by said flow measuring means to vary the capacitance of said second capacitor upon operation of said flow measuring means such that the capacitance of said second capacitor is a function of the quantity of fluid still in the second container; second means connecting said second capacitor to a source of voltage in a manner to derive a signal from said second capacitor indicative of the quantity of fluid in the second container; and signals responsive indicating means connected to said first and second means and controlled by the signals therefrom for indicating the total quantity of fluid in the containers.

3. Apparatus for measuring the quantity of fluid in several containers comprising in combination: first impedance means inserted in a first container and extending from the top of the container to the bottom and affected by the fluid such that the impedance of said first impedance means varies with the height of the fluid in the container; first electrical connection means connecting said first impedance means to a source of voltage in a manner to derive a signal from said first impedance means indicative of the quantity of fluid in the first container; flow measuring means in an output pipe of a second container operative upon flow of fluid through the pipe; second impedance means connected to be controlled by said flow measuring means and adjusted thereby to vary the impedance of said second impedance means upon operation of said flow measuring means such that the impedance of said second impedance means is a function of the quantity of fluid still in the second container; second electrical connection means connecting said second impedance means to a source of voltage in a manner to derive a signal from said second impedance means indicative of the quantity of fluid in the second container; signal responsive indicating means connected to said first and second impedance means and controlled by the signals therefrom in a manner for indicating the total quantity of fluid in the containers; and rebalance means controlled by said indicating means and connected to said indicating means in a manner to apply a further signal thereto to tend to neutralize the signals from said first and second impedance means.

4. Apparatus for measuring the quantity of fluid in several containers comprising in combination: a first capacitor inserted in a first container and extending from the top of the container to the bottom and affected by the fluid such that the capacitance of said first capacitor varies with the height of the fluid in the container; first electrical means connecting said first capacitor to a source of voltage in a manner to derive a signal from said first capacitor indicative of the quantity of fluid in the first container; flow measuring means in an output pipe of a second container operative upon flow of fluid through the pipe; a second capacitor connected to said flow measuring means to be controlled thereby in such a manner that the capacitance of said second capacitor is varied upon operation of said flow measuring means so that the capacitance of said second capacitor is a function of the quantity of fluid still in the second container; second electrical means connecting said second capacitor to a source of voltage in a manner to derive a signal from said second capacitor indicative of the quantity of fluid in the second container; signal responsive indicating means connected to said first and second capacitors and controlled by the signals therefrom in a manner for indicating the total quantity of fluid in the containers; and rebalance means controlled by said indicating means and connected to said indicating means in a manner to supply a further signal thereto to tend to neutralize the signals from said first and second capacitors.

5. Apparatus for measuring the quantity of fluid in several containers comprising in combination: first impedance means inserted in a first container and extending from the top of the container to the bottom and affected by the fluid such that the impedance of said first impedance means varies with the height of the fluid in the container; first electrical connection means connecting said first impedance means to a source of voltage in a manner to derive a signal from said first impedance means indicative of the quantity of fluid in the first container; flow measuring means in an output pipe of a second container operative upon flow of fluid through the pipe; second impedance means connected to said flow measuring means to be controlled thereby and arranged to be adjusted thereby to vary the impedance of said second impedance means so that the impedance of said second impedance means is a function of the quantity of fluid still in the second container; second electrical connection means connecting said second impedance means to a source of voltage in a manner to derive a signal from said second impedance means indicative of the quantity of fluid in the second container; signal responsive indicating means connected to said first and second impedance means and controlled in accordance with the signals therefrom for indicating the total quantity of fluid in the containers; and means disconnecting said second impedance means from said indicating means upon the second container being emptied of fluid.

6. Apparatus for measuring the quantity of fluid in several containers comprising in combination: a first capacitor inserted in a first container and extending from top of the container to the bottom and affected by the fluid such that the capacitance of said first capacitor varies with the height of the fluid in the container; electrical connection means connecting said first capacitor to a source of voltage in a manner to derive a signal from said first capacitor indicative of the quantity of fluid in the first container; flow measuring means in an output pipe of a second container operative upon flow of fluid through the pipe; a second capacitor connected to said flow measuring means and controlled thereby for adjustment thereby to vary the capacitance of said second capacitor upon operation of said flow measuring means so that the capacitance of said second capacitor is a function of the quantity of fluid still in the second container; electrical connection means connecting said second capacitor to a source of voltage in a manner to derive a signal from said second capacitor indicative of the quantity of fluid in the second container; signal responsive indicating means connected to said first and second capacitors and controlled by the signals therefrom for indicating the total quantity of fluid in the containers; and means disconnecting said second capacitor from said indicating means upon the second container being emptied of fluid.

7. Apparatus for measuring the quantity of fluid in several containers comprising in combination: first impedance means inserted in a first container and extending from the top of the container to the bottom and affected by the fluid such that the impedance of said first impedance means varies with the height of the fluid in the container; electrical connection means connecting said first impedance means to a source of voltage in a manner to derive a signal from said first impedance means indicative of the quantity of fluid in the first container; flow measuring means in an output pipe of a second container operative upon flow of fluid through the pipe; second impedance means controlled by said flow measuring means and adjusted thereby to vary the impedance of said second impedance means upon operation of said flow measuring means so that the impedance of said second impedance means is a function of the quantity of fluid still in the second container; electrical connection means connecting said second impedance means to a source of voltage in a manner to derive a signal from said second impedance means indicative of the quantity of fluid in the second container; signal responsive indicating means connected to said first and second impedance means and responsive to the signals therefrom for indicating the total quantity of fluid in the containers; and means responsive to the absence of fluid in the second container for disconnecting said second impedance means from said indicating means upon the second container being emptied of fluid and substituting for said second impedance means an impedance equal to the impedance of said second impedance means upon the container being empty and resetting said second impedance means to its impedance value indicative of a full second container.

8. Apparatus for measuring the quantity of fluid in several containers comprising in combination: a first capacitor inserted in a first container and extending from the top of the container to the bottom and affected by the fluid such that the capacitance of said first capacitor varies with the height of the fluid in the container; electrical connection means connecting said first capacitor to a source of voltage in a manner to derive a signal from said first capacitor indicative of the quantity of fluid in the first container; flow measuring means in an output pipe of a second container operative upon flow of fluid through the pipe; a second capacitor connected to be controlled by said flow measuring means for adjustment thereby to vary the capacitance of said second capacitor upon operation of said flow measuring means so that the capacitance of said second capacitor is a function of the quantity of fluid still in the second container; electrical connection means connecting said second capacitor to a source of voltage for deriving a signal from said second capacitor indicative of the quantity of fluid in the second container; indicating means connected to said first and second capacitors and controlled by the signals therefrom for indicating the total quantity of fluid in the containers; and means responsive to the absence of fluid in the second container for disconnecting said second capacitor from said indicating means upon the second container being emptied of fluid and substituting for said second capacitor a capacitance equal to the capacitance equal to the capacitance of said capacitor upon the second container being empty and resetting said second capacitor to its capacitance value indicative of a full second container.

9. Apparatus for measuring the quantity of fluid in several containers comprising in combination: a first capacitor inserted in a first container and extending from the top of the container to the bottom and affected by the fluid such that the capacitance of said first capacitor varies with the height of the fluid in the container; electrical connection means connecting said first capacitor to a source of voltage in a manner to derive a signal from said first capacitor indicative of the quantity of fluid in the first container; flow measuring means in an output pipe of a second container operative upon flow of fluid through the pipe; a second capacitor connected to be controlled by said flow measuring means for adjustment thereby to vary the capacitance of said second capacitor upon operation of said flow measuring means so that the capacitance of said second capacitor is a function of the quantity of fluid still in the second container; electrical connection means connecting said second capacitor to a source of voltage in a manner to derive a signal from said second capacitor indicative of the quantity of fluid in the second container; indicating means connected to said first and second capacitors and controlled by the signals therefrom for indicating the total quantity of fluid in the containers; rebalance means connected to said indicating means and controlled thereby to supply a further signal thereto to tend to neutralize the signals from said first and second capacitors; and means responsive to the lack of fluid available from the second container for disconnecting said second capacitor from said indicating means upon the second container being emptied of fluid and substituting for said second capacitor a capacitance equal to the capacitance of said second capacitor upon the second container being empty and resetting said second capacitor to its capacitance value indicative of a full second container.

10. Apparatus for measuring the quantity of fluid in a container comprising in combination: flow measuring means in an output pipe of a container operative upon flow of fluid through the pipe; impedance means adjustable by said flow measuring means upon operation of said flow measuring means in such manner that the impedance of said impedance means is a function of the quantity of fluid still in the container; means connecting said impedance means to a source of voltage to provide a signal indicative of the quantity of fluid in the container; signal responsive means connected to said impedance means to be controlled by the signal therefrom; and rebalance means controlled by said signal responsive means and connected to said signal responsive means to supply a further signal thereto to tend to neutralize the signal from said impedance means.

11. Apparatus for measuring the quantity of fluid in a container comprising in combination: flow measuring means in an output pipe of a container operative upon flow of fluid through the pipe; a variable capacitor connected to said flow measuring means for adjustment thereby to vary the capacitance of said capacitor upon operation of said flow measuring means in such manner that the capacitance of said capacitor is a function of the quantity of fluid still in the container; means connecting said capacitor to a source of voltage to provide a signal indicative of the quantity of fluid in the container; signal responsive means connected to said capacitor to be controlled by the signal therefrom; and rebalance means controlled by said signal responsive means and connected to said signal responsive means to supply a further signal thereto to tend to neutralize the signal from said capacitor.

12. Apparatus for measuring the quantity of fluid in a container comprising in combination: flow measuring means in an output pipe of a container operative upon flow of fluid through the pipe; impedance means adjusted by said flow measuring means to vary the impedance of said impedance means upon operation of said flow measuring means in such a manner that the impedance of said impedance means is a function of the quantity of fluid still in the container; means connecting said impedance means to a source of voltage to provide a signal indicative of the quantity of fluid in the container; signal responsive means connected to said impedance means to be controlled by said signal; rebalance means controlled by said signal responsive means connected to said signal responsive means to supply a further signal thereto to tend to neutralize the signal from said impedance means; and means including means responsive to the absence of fluid available from the container for disconnecting said impedance means from said signal responsive means upon the container being emptied of fluid and substituting for said impedance means an impedance equal to the impedance of said impedance means upon the container being empty and resetting said impedance means to its impedance value indicative of a full container.

13. Apparatus for measuring the quantity of fluid in a container comprising in combination: flow measuring means in an output pipe of a container operative upon flow of fluid through the pipe; a variable capacitor connected to said flow measuring means for adjustment thereby to vary the capacitance of said capacitor upon operation of said flow measuring means so that the capacitance of said capacitor is a function of the quantity of fluid still in the container; means connecting said capacitor to a source of voltage to provide a signal indicative of the quantity of fluid in the container; signal responsive means connected to said capacitor to be controlled by said signal; rebalance means controlled by said signal responsive means and connected to said signal responsive means to apply a further signal thereto to tend to neutralize the signal from said capacitor; and means including means responsive to the lack of available fluid from the container for disconnecting said capacitor from said signal responsive means upon the container being emptied of fluid and substituting for said capacitor a capacitance equal to the capacitance of said capacitor upon the container being empty and resetting said capacitor to its capacitance value indicative of a full container.

References Cited in the file of this patent

UNITED STATES PATENTS

| | | |
|---|---|---|
| 976,460 | Hayes | Nov. 22, 1910 |
| 2,188,628 | Freystedt | Jan. 30, 1940 |
| 2,563,280 | Schafer | Aug. 7, 1951 |
| 2,563,281 | Griffith | Aug. 7, 1951 |

FOREIGN PATENTS

| | | |
|---|---|---|
| 385,265 | Great Britain | Mar. 13, 1931 |
| 464,072 | Great Britain | Apr. 12, 1937 |